(12) United States Patent
Hager et al.

(10) Patent No.: US 11,268,576 B2
(45) Date of Patent: Mar. 8, 2022

(54) SLIDING BEARING ASSEMBLY

(71) Applicant: Miba Gleitlager Austria GmbH, Laakirchen (AT)

(72) Inventors: Gunther Hager, Micheldorf (AT); Kamal Hamdard, Gmunden (AT); Stefan Schallmeiner, Roitham (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 17/272,307

(22) PCT Filed: Aug. 26, 2019

(86) PCT No.: PCT/AT2019/060272
§ 371 (c)(1),
(2) Date: Feb. 27, 2021

(87) PCT Pub. No.: WO2020/041809
PCT Pub. Date: Mar. 5, 2020

(65) Prior Publication Data
US 2021/0310521 A1 Oct. 7, 2021

(30) Foreign Application Priority Data

Aug. 29, 2018 (AT) .............................. A50741/2018

(51) Int. Cl.
*F16C 17/02* (2006.01)
*F16C 17/24* (2006.01)
*F16C 41/00* (2006.01)

(52) U.S. Cl.
CPC ............ *F16C 41/008* (2013.01); *F16C 17/02* (2013.01); *F16C 17/24* (2013.01); *F16C 2202/36* (2013.01); *F16C 2233/00* (2013.01)

(58) Field of Classification Search
CPC .... F16C 9/02; F16C 9/04; F16C 17/02; F16C 17/022; F16C 41/008; F16C 2202/36; F16C 2233/00; G01M 13/04; G01L 5/0019
See application file for complete search history.

(56) References Cited

U.S. PATENT DOCUMENTS

| 4,237,454 | A | 12/1980 | Meyer |
| 6,259,372 | B1 | 7/2001 | Taranowski et al. |
| 6,446,497 | B1 * | 9/2002 | Glaser ................... G01H 1/003 73/114.57 |

(Continued)

FOREIGN PATENT DOCUMENTS

| AT | 408900 B | 3/2002 |
| DE | 10311569 A1 | 9/2004 |

(Continued)

*Primary Examiner* — Phillip A Johnson
(74) *Attorney, Agent, or Firm* — Stoel Rives LLP

(57) ABSTRACT

A sliding bearing assembly includes at least one sliding bearing element which is arranged in a bearing receptacle that is part of a bearing structure having at least one sensor connected to a data transmission device for data transmission to a receiver of the data, and to an energy generating device. The energy generating device supplies the sensor and/or the data transmission device with electrical energy in a self-sufficient manner, and may include a piezo element which is pretensioned under pressure. In some embodiments, the energy generating device is the sensor.

6 Claims, 3 Drawing Sheets

(56) References Cited

U.S. PATENT DOCUMENTS

| | | | |
|---|---|---|---|
| 6,925,854 B2 * | 8/2005 | Neumann | F16C 33/107 73/37 |
| 9,530,258 B2 | 12/2016 | Bell et al. | |
| 2005/0087019 A1 | 4/2005 | Face | |
| 2015/0168255 A1 | 6/2015 | Hamilton et al. | |
| 2016/0208849 A1 | 7/2016 | Gorges et al. | |
| 2017/0241362 A1 | 8/2017 | Beerens | |

FOREIGN PATENT DOCUMENTS

| | | |
|---|---|---|
| DE | 102007052426 A1 | 5/2009 |
| DE | 102013225330 A1 | 6/2015 |
| JP | 2009254163 A | 10/2009 |

\* cited by examiner

SLIDING BEARING ASSEMBLY

RELATED APPLICATIONS

This application is a national stage under 35 U.S.C. § 371 of International Application No. PCT/AT2019/060272, filed Aug. 26, 2019, which claims priority of Austrian Patent Application No. A50741/2018, filed Aug. 29, 2018.

OVERVIEW

The present disclosure relates to a sliding bearing assembly comprising at least one sliding bearing element which is arranged in a bearing receptacle, i.e. bearing mount, the bearing receptacle being part of a bearing structure, and the bearing structure having at least one sensor which is connected to a data transmission device for, in particular wireless, data transmission to a receiver of the data, and to an energy generating device for supplying the sensor and/or the data transmission device with electrical energy in a self-sufficient manner.

The present disclosure further relates to a method for monitoring a sliding bearing element in a sliding bearing receptacle of a sliding bearing assembly with at least one sensor, wherein a measured value is detected with the sensor and this measured value is forwarded to a data transmission device for, in particular wireless, data transmission to a receiver of the data, and wherein the electrical energy for the sensor and the data transmission device is generated by the movement of the sliding bearing element or the sliding bearing assembly.

In addition, the present disclosure relates to the use of a sensor formed as a piezo element.

In recent years, sensor-based monitoring of sliding bearings has become increasingly important. In addition to the indirect measurement of sliding bearing parameters, for example due to the temperature increase of the bearing receptacle, the arrangement of sensors in or in the immediate vicinity of the lubrication gap is increasingly at the forefront of development. In this context, it is not only the environmental conditions for the sensors that are problematic, but also the mechanical characteristics peculiar to sliding bearings, such as the presence of rotating components. By way of example, reference is made to AT 408 900 B, from which a device for monitoring a sliding bearing, which has a bearing shell clamped in a support body, is known, with at least one sensor for temperature-dependent measurement signals arranged in the bearing shell area and with an evaluation circuit for the measurement signals. The sensor is designed as a pressure sensor for pressure forces acting in the circumferential direction of the bearing shell or for radial pressure forces between the bearing shell and the supporting body.

In this context, the question of energy supply to the sensors arises. It is already known from the prior art that energy is to be generated directly in the sliding bearing. For example, US 2016/0208849 A1 describes a sliding bearing and a method of manufacturing the same. The sliding bearing may comprise a metallic substrate, an electrically insulating layer on the metallic substrate, and an electrical component on the electrically insulating layer. The sliding bearing may be operatively connected to a monitoring module configured to monitor the electrical component. The bearing shell may include microgenerators for locally generating energy from mechanical energy, such as from mechanical vibrations in the bearing shell.

Also known from EP 2 963 409 A1 is a system comprising a plurality of substantially identical components in the form of self-lubricating rotor pitch control bearings of a helicopter operating under substantially identical conditions, each of said components being equipped with at least one sensor for measuring the same operating parameter of said components at a given time. Further, the system includes a monitoring unit configured to receive and process signals from the sensors and generate maintenance data based on the sensor signals. The components may be provided with energy harvesting means for generating energy from the movements of a component relative to other components. Continuous and autonomous operation of the sensors is thus enabled.

WO 2013/160053 A1 describes a method for monitoring a rolling bearing comprising the step of obtaining data in relation to one or more of the factors affecting the remaining life of the bearing using at least one sensor, obtaining identification data uniquely identifying the bearing, transmitting data to and/or from the at least one sensor using an industrial wireless protocol, and recording the data in relation to one or more of the factors affecting the remaining life of the bearing and the identification data as recorded data in a database, wherein at least one sensor is configured to be driven by electricity generated by the movement of a bearing or the bearing when in use.

Embodiments according to the present disclosure may improve the energy supply to a sensor in a sliding bearing assembly.

Such benefits may be achieved in the aforementioned sliding bearing assembly by an energy generating device that has at least one piezo element pretensioned under pressure, or with an energy generating device that is the sensor.

Further, disclosed are methods according to which it is provided that for the generation of the electrical energy at least one piezo element is used which is pretensioned under pressure, or that the generation of the electrical energy is carried out with the sensor.

In addition, some embodiments of the present disclosure may use a sensor designed as a piezo element to generate electrical energy with the aid of the lubricant pressure in the lubrication gap or with the aid of the movement of the sensor in monitoring a sliding bearing element during operation of the sliding bearing element.

The advantage of this is that the compressive bias of the piezo element allows it to be better integrated into the sliding bearing assembly, as its load capacity can thus be improved. In addition, the quantity of electrical energy generated can be increased because the piezo element expands against the bias when it is accelerated, which means that the entire available operating range of the piezo element can be better utilized. A smaller piezo element can thus be used with the same energy consumption. This is again advantageous with regard to the limited installation space in sliding bearing assemblies. In addition to improved energy generation, installation space can also be saved in the embodiment variant of the sliding bearing assembly with energy generation by the sensor itself.

Preferably, according to one embodiment of the present disclosure, it can be provided that the piezo element is connected to a seismic mass. In addition to the effects mentioned above, a simpler installation can thus be achieved, since the piezo element can be (directly) connected to a component of the sliding bearing assembly. Furthermore, the seismic mass can also be used to influence the force acting on the piezo material and thus on the extent of the charge displacement.

According to another embodiment of the present disclosure, it can be provided that the piezo element can be acted upon by the lubricant pressure in the lubrication gap of the sliding bearing element. According to one embodiment variant of the method, it can be provided for this purpose that the sensor is arranged in the lubrication gap of the sliding bearing or is hydrostatically connected to the lubrication gap and the pressure in the lubrication gap is measured with the sensor, electrical energy being generated by the influence of the pressure on the sensor. High pressures sometimes prevail in the lubrication gap of a sliding bearing. By applying the lubricant pressure in the lubrication gap to the piezo element, not only can the pressure itself be measured, but the use of a piezo element also provides a simple way of using the pressure to generate electrical energy for supplying the sensor, if necessary.

According to a further embodiment of the invention, the sensor can be embedded in the radially innermost layer of the sliding bearing element, whereby the measured value acquisition can be improved, since interference effects, which can occur when the sensor is further away from the lubrication gap, can be largely avoided. In addition, this can also improve energy harvesting, especially if the electrical energy is generated from the lubricant pressure.

According to another embodiment of the present disclosure, the bearing structure can be a connecting rod with a connecting rod shank, wherein the data transmission device is arranged on or at least partially in the connecting rod shank, so that the connecting rod eyes are thus available, unaffected thereby, for the arrangement of the sensor, in particular the energy generating sensor, and thus the position of the sensor can be selected relatively freely with regard to energy generation.

BRIEF DESCRIPTION OF THE DRAWINGS

For a better understanding of the invention, it is explained in more detail with reference to the following figures.

Therein, they show respectively in simplified schematic diagrams.

DETAILED DESCRIPTION OF PREFERRED EMBODIMENTS

By way of introduction, it should be noted that in the differently described embodiments, the same parts are provided with the same reference signs or the same component designations, whereby the disclosures contained in the entire description may be transferred mutatis mutandis to the same parts with the same reference signs or the same component designations. Also, the positional indications selected in the description, such as top, bottom, side, etc., are related to the directly described as well as depicted figure, and these positional indications are to be transferred mutatis mutandis to the new position in the event of a change of position.

Figure 1:
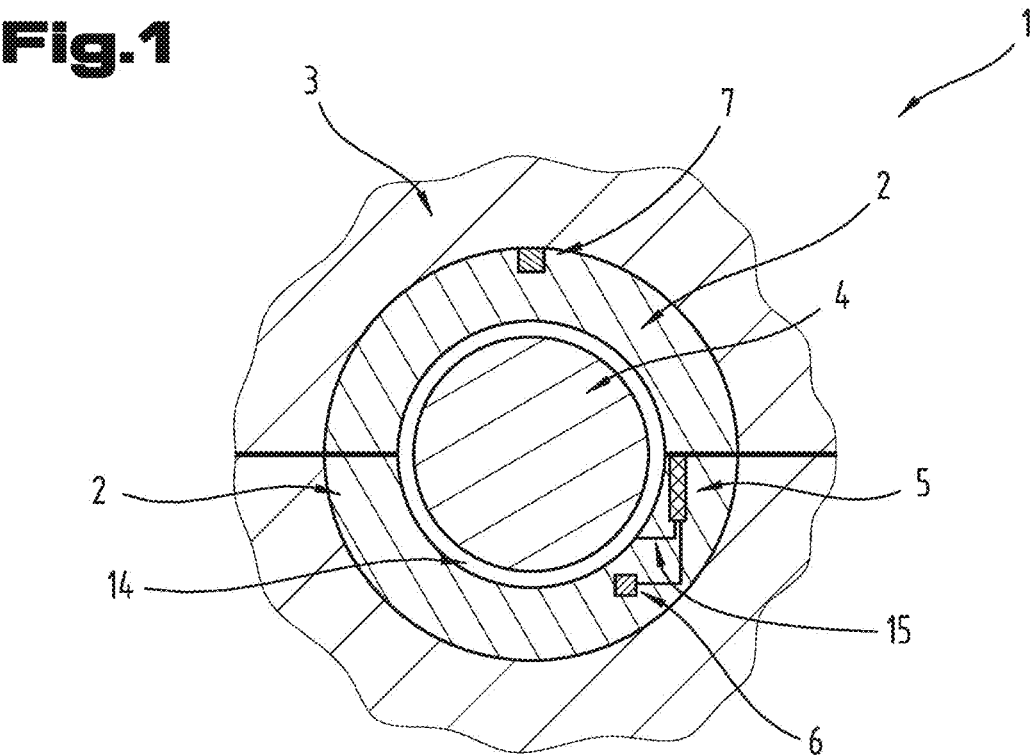
FIG. 1 a section of a sliding bearing assembly.

FIG. 1 shows a section of a sliding bearing assembly 1.

The sliding bearing assembly comprises at least one sliding bearing element 2. In the illustrated embodiment example, two sliding bearing elements 2 are shown which have the form of so-called half shells. However, it is also possible for the sliding bearing element 2 to be designed as a sliding bearing bush. In addition, the sliding bearing equipped with the sliding bearing elements 2 can have a different pitch, so that, for example, three or four or more than four sliding bearing elements 2 can be installed in the sliding bearing. In very large sliding bearings, such as those used in wind turbines, for example, the sliding bearing elements 2 can also be designed as sliding bearing pads, in which cases there can be significantly more than four sliding bearing elements 2, for example up to 40 sliding bearing elements 2, in the sliding bearing.

The at least one sliding bearing element 2 is arranged in a bearing seat 3, for example by means of a press fit.

However, it is also possible for the bearing receptacle 3 to be directly coated, so that the bearing receptacle 3 also forms the sliding surface for a component mounted in the sliding bearing assembly 1, for example a shaft 4. In this case, the sliding bearing element 2 and the bearing receptacle 3 are formed integrally with each other, so that the sliding bearing element 2 forms an integral part of the bearing receptacle 3.

In these embodiments of the sliding bearing assembly 1, the mating surface of the sliding bearing forms the surface of the shaft. However, there is also the reverse possibility of the arrangement of the at least one sliding bearing element 2, namely the rotationally fixed connection to the shaft 4. In this case, the mating surface is formed by the surface of the bearing receptacle 3, in which the sliding bearing is received in the assembled state of the sliding bearing assembly 1 but is not connected thereto in a rotationally fixed manner.

The at least one sliding bearing element 2 and the bearing receptacle 3 are part of a bearing structure which, in addition to these two components, also comprises at least one sensor 5. Of course, more than one sensor 5 can also be arranged in the sliding bearing assembly 1.

The sensor 5 can, for example, be a temperature sensor, a pressure sensor, etc. With the aid of the at least one sensor 5, parameters of the sliding bearing assembly 1 can be recorded during operation. These parameters can be used, for example, to draw conclusions about the condition of the at least one sliding bearing element 2, since, for example, in the event of an abnormal increase in temperature, it is possible to draw conclusions about the wear of the sliding surface of the sliding bearing element 2 or the failure of the sliding bearing element 2. Essential parameters for the operation of the sliding bearing assembly 1 can therefore be detected with the sensor 5.

Preferably, the processing of the recorded parameters, i.e. the associated data, is not carried out in the sliding bearing assembly 1 itself, but in a data processing element arranged at a distance from the at least one sliding bearing element 2. For the data transmission to this at least one data processing element, the sliding bearing assembly 1 may comprise a data transmission device 6 which receives the data from the at least one sensor 5 and forwards it, in particular wirelessly, to the at least one data processing element as data receiver. The known protocols can be used for the wireless data transmission. The wireless data transmission can be carried out, for example, by means of Bluetooth or WLAN, etc.

Since such systems of data acquisition in sliding bearing elements and wireless transmission to an external location for this purpose are already known from the relevant prior art for sliding bearings, reference is made to this prior art for further details in order to avoid repetition.

The sliding bearing assembly 1 also has an energy generating device 7. With the aid of this energy generating device 7, it is possible to supply the at least one sensor 5 and/or the data transmission device 6 with electrical energy in a self-sufficient manner, so that no wired connections of the sliding bearing assembly 1 to the outside are required for this.

Figure 2:
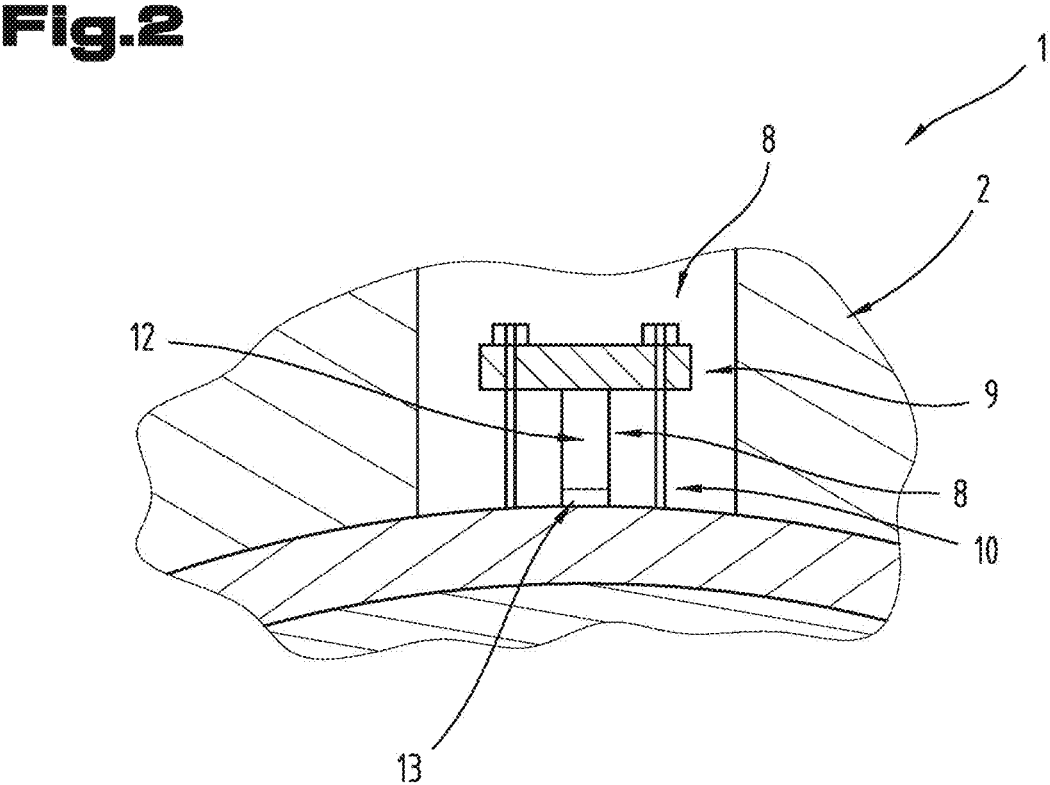
FIG. 2 a detail of a sliding bearing assembly.

The at least one energy generating device 7 (more than one energy generating device 7 may also be arranged in the sliding bearing assembly 1) is arranged in or on the at least one sliding bearing element 2 in the illustrated embodiment of the sliding bearing assembly 1, for example in a recess 8 in the sliding bearing element 2, as can be seen from FIG. 2, which shows a detail of the sliding bearing assembly according to FIG. 1. It should be noted, however, that this specifically illustrated arrangement of the energy generating device 7, as well as the specifically illustrated arrangement of the sensor 5 in a bore of the sliding bearing element 2 or the specifically illustrated arrangement of the data transmission device 6, have no limiting character whatsoever, but merely serve to explain the invention. Constructively, the arrangement of these elements can also be solved differently.

The energy generating device 7 has at least one piezo element 8, which is shown in FIG. 2. Depending on the amount of energy required, more than one piezo element 8 can also be arranged in the sliding bearing assembly 1 for generating electrical energy, for example in the form of a piezo element package.

The at least one piezo element 8 can be designed as a multilayer stack, i.e., a multilayer piezo element 8 with multiple piezo elements arranged on top of each other.

The piezo element 8 may have any cross-sectional shape, such as a circular shape or a rectangular shape, such as a square shape.

This piezo element 8 is arranged in the sliding bearing assembly 1 pretensioned under pressure. For this purpose, as illustrated in FIG. 2, a pressure beam 9 can be arranged resting on the piezo element 8 in the sliding bearing assembly 1. The pressure beam 8 can be fixed in the sliding bearing element 2 by means of two screws 10. By means of the two screws 10, the pressure acting on the piezo element 8 can be adjusted.

Figure 3:
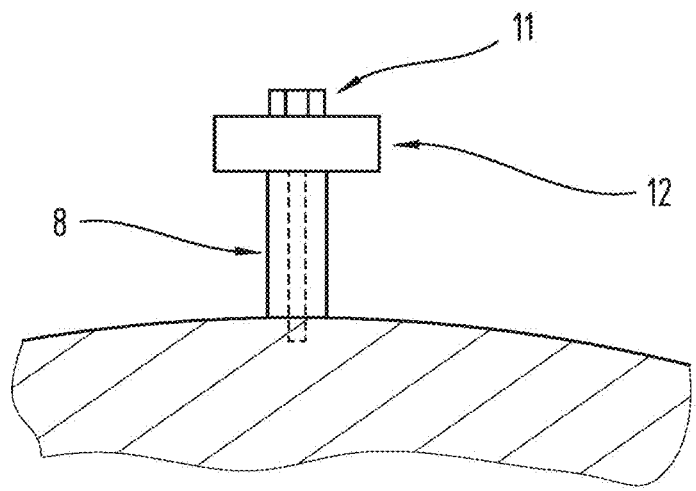
FIG. 3 a detail of another embodiment variant of the sliding bearing assembly.
Figure 4:
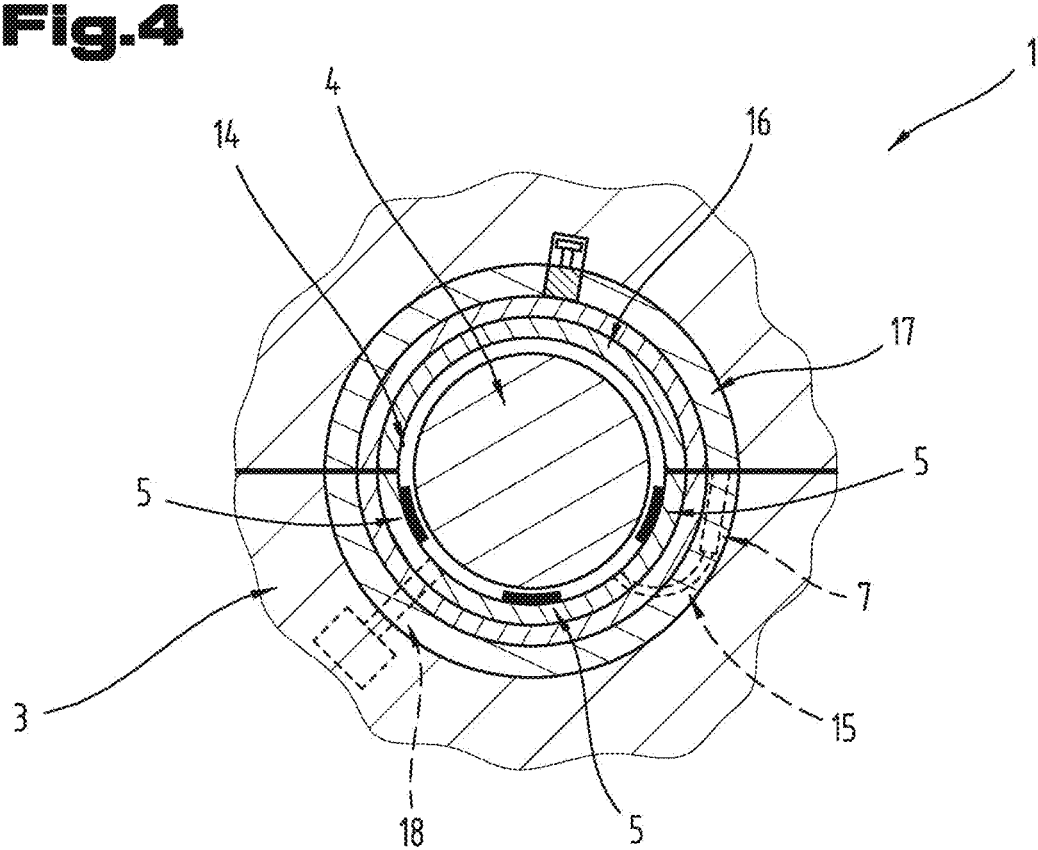
FIG. 4 a section of an embodiment of the sliding bearing assembly.

Alternatively, as shown in FIG. 3, an adjusting screw 11 can be arranged above the piezo element 8, the adjustment of which can be used to change the pressure acting on the piezo element 8. The adjusting screw 11 can extend through the piezo element 8 and, if necessary, be screwed into the sliding bearing element 2 (FIG. 1) or into the bearing receptacle 3 (FIG. 1), as illustrated in FIG. 4.

In principle, the at least one piezo element 8 can also be otherwise pretensioned under pressure, for example by means of a spring element, etc.

Preferably, the at least one piezo element 8 is not twisted by the bias, i.e., the two end faces (upper and lower end face) of the piezo element 8 are not twisted relative to each other along the longitudinal center axis by the bias.

In the described arrangement of the bias, the piezo element 8 is arranged free-standing on or in the sliding bearing element 8, as can be seen in FIG. 2. However, it is also possible for the piezo element 8 to be arranged in a recess which corresponds to that of the piezo element 8 in terms of size and shape of the cross-section, so that the latter can be pushed into the recess and can also be supported or guided laterally in this recess.

For the sake of completeness, it should be noted that the operating principle of a piezo element 8 is not described here, as this is described in detail in the literature and is also known to the person skilled in the art.

The at least one piezo element 8 may be pretensioned under a pressure selected from a range of 5 MPa to 50 MPa, in particular from 5 MPa to 30 MPa.

The at least one piezo element 8 can be made of lead zirconate titanate (PZT) or barium titanate, for example. However, other piezo materials can also be used.

According to one embodiment, it can be provided that the piezo element 8 is connected to a seismic mass 12. In this case, the piezo element 8 can have a piezo-active layer 13, which is arranged below the seismic mass 12, i.e. can be arranged, for example, adjacent to the sliding bearing element 2, as shown in FIG. 2. Accordingly, the seismic mass 12 is arranged above the piezo-active or piezoelectric layer 13 (radially further outside than the piezo-active layer 13) and connected thereto, for example glued thereto.

However, the seismic mass 12 can also be formed by the pressure beam 9, so that the piezo element 8 can thus extend over the entire height to the pressure beam 8.

In the embodiment according to FIG. 3, the seismic mass 12 can be formed by a disk element arranged between the piezo element 8 and the adjusting screw 11, in particular directly adjacent to the piezo element 8 and the adjusting screw 11.

The seismic mass 12 may be made of a material having a density of at least 7 g/cm$^3$, for example, steel, tungsten, lead, nickel, gold, platinum, etc. . . . .

If the piezo element 8 itself has a relatively high mass (due to the choice of material), then it may be advantageous if this is designed without seismic mass 12.

As an alternative to the foregoing embodiments with the piezo element 8 pretensioned under pressure, or in addition thereto, it may be provided according to another embodiment of the present disclosure that the energy generating device 7 is the sensor 5 itself.

For this purpose, the sensor 5, which in this case is in particular a pressure sensor, preferably an indexing sensor or cylinder pressure indexing sensor can be hydrostatically connected via a line 15 to a lubrication gap 14 of the sliding bearing assembly 1. Via this line 15, the sensor 5 can be acted upon by the lubrication gap pressure, so that thus the pressure of the lubricant in the lubrication gap can be measured.

The line 15 can be relatively small in size. For example, the line can have a diameter between 0.5 mm to 2 mm.

Since in this case the sensor 5 can also be a piezo-active or piezoelectric element, electrical energy can also be generated with the sensor 5 as in the above-mentioned embodiment variant with the piezo element 8, if necessary not only by accelerations that vary in time and/or direction relative to the sensor 5, but if necessary also due to pressure changes.

The sensor 5 can be designed for pressures up to 10,000 bar.

Alternatively or in addition to the connection of the sensor 5 with the line 15 to the lubrication gap 14, according to a further embodiment of the sliding bearing assembly 1 it can be provided that the sensor 5 is arranged in the lubrication gap 14 of the sliding bearing assembly 1, for example as part of the sliding layer of the sliding bearing element 2. Also with this, as in the aforementioned embodiment of the sliding bearing assembly with the line 15 to the lubrication gap 14, the piezo element 8 can be subjected to the lubricant pressure in the lubrication gap 14 of the sliding bearing assembly 1.

By applying the lubricant pressure to the sensor 5, the sensor 5 can be used to generate electrical energy in addition to simply measuring a parameter of the sliding bearing assembly.

According to another embodiment variant of the sliding bearing assembly 1, which is illustrated in detail in FIG. 4, it can be provided that the sensor 5 is embedded in a radially innermost layer of the sliding bearing element 2. Namely, the sliding bearing element 2 may be designed as a so-called multilayer sliding bearing and comprise at least a sliding layer 16 and a support layer 17. Between these, further layers, such as a bearing metal layer and/or a bonding agent layer and/or a diffusion barrier layer, etc., may be arranged. The sliding layer 16 is thereby known to be that layer on which the shaft 4 slides during operation. The sliding layer 16 can, for example, consist of a ceramic material or of a sliding anti-friction varnish. Alternatively, however, it can also be provided that the sensor 5 is arranged in a layer arranged below the sliding layer 16 and is separated from the sliding layer 16 via an electrically insulating layer, for example a ceramic layer, e.g. of Al2O3. In this case, the sliding layer 16 can also be made of a known metallic material, for example a tin-based alloy.

It should be noted that in the case of direct coating, as mentioned above, the support layer 17 is formed by the respective directly coated component.

As can be seen from FIG. 4, several sensors 5 can also be arranged in the sliding bearing assembly 1 at different locations, so that the operating parameters of differently loaded locations in the sliding bearing assembly 1 can be recorded.

Furthermore, it can be seen from FIG. 4 that the sensor 5 used above as the energy generating device 7 can be combined with other sensors 5 in the sliding bearing assembly 1.

In addition, FIG. 4 shows that it is also possible to place the sensor 5, in particular the energy generating device 7, in the bearing receptacle 3 and to connect it hydrostatically to the lubrication gap 14 via a line 18.

Figure 5:
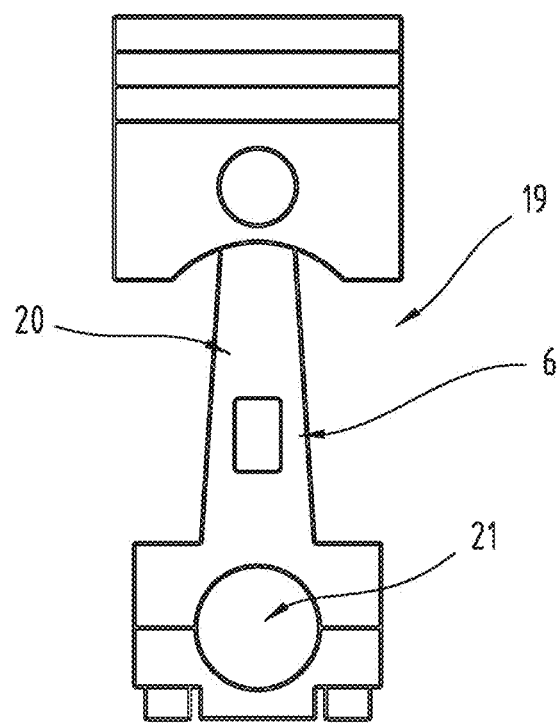
FIG. 5 another embodiment variant of a sliding bearing assembly.

According to a preferred embodiment, the sliding bearing assembly 1 or the bearing structure is a connecting rod 19 with a connecting rod shank 20. The data transmission device 6 is arranged on or at least partially in the connecting rod shank 20, as shown in FIG. 5. The preceding explanations concerning the generation of electrical energy and the arrangement of the at least one sensor 5 are applicable in particular to the large connecting rod eye, so that operating parameters are thus supplied from the sliding bearing assembly in the large connecting rod eye 21 to the data transmission device 6 and are forwarded wirelessly from there.

Figure 6:
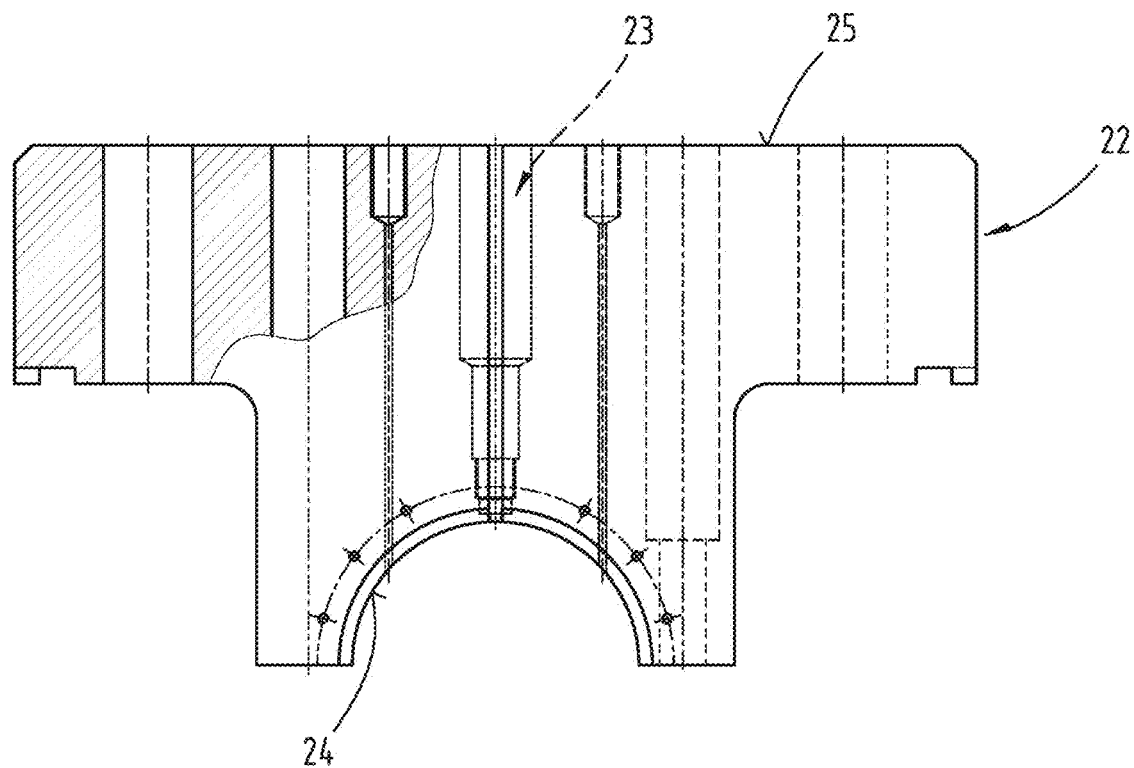
FIG. 6 an embodiment of a bearing cover.

As shown in FIG. 6, according to one embodiment, it is possible for the sensor 5, in particular the indexing sensor, to be integrated in a bearing cover 22 of a split bearing assembly, which can also still comprise the counterpart to the bearing cover 22, such as a bearing bracket or a connecting rod shank (not shown). For this purpose, a radially outwardly extending bore 23 may be provided, which may be of stepped design, as shown in FIG. 6. The bore 23 extends continuously from an inner sliding surface or sliding bearing element receiving surface 24 into an outer surface 25 of the bearing cover 22. In the event that a sliding bearing element 2 is arranged in the bearing cover 22 in a rotationally fixed manner connected to the bearing cover 22, a corresponding bore can also be arranged in this sliding bearing element 2 in extension of the bore 23 through the bearing cover 22.

Through this bore 22 (and, if applicable, the bore in the sliding bearing element 2), it is possible to apply the lubrication gap pressure to the sensor 5 located in the bore 22 in order to measure it and/or generate electrical energy.

If necessary, it is possible in all embodiment variants of the present disclosure that at least one energy storage element is also arranged in the sliding bearing assembly 1, which may be supplied with electrical energy by the piezo element 8 or the piezo sensor 5.

It is possible with the sliding bearing assembly 1 to monitor a sliding bearing element 2 in a sliding bearing receptacle (bearing receptacle 3) of a sliding bearing assembly 1 with at least one sensor 5, wherein a measured value is detected with the sensor 5 and this measured value is forwarded to the data transmission device 6 for, in particular wireless, data transmission to a receiver of the data, and wherein the electrical energy for the sensor 5 and/or the data transmission device 6 is generated by the movement of the sliding bearing element 2 or the sliding bearing assembly 1 during operation. For the generation of the electrical energy, at least one piezo element 8 may be used, which is pretensioned under pressure. Alternatively or in addition, the generation of the electrical energy can be done with the sensor 5 itself.

The sensor 5 may be arranged in the lubrication gap 14 of the sliding bearing assembly 1 or may be hydrostatically connected to the lubrication gap 14, so that the sensor 5 may be used to measure the pressure in the lubrication gap 14, whereby electrical energy may be generated by the influence of the pressure on the sensor. Alternatively or additionally, electrical energy can be generated by the movement of the sensor 5.

Within the scope of the invention, it is possible to use a sensor 5 formed as a piezo element 8 to generate electrical energy using the lubricant pressure in the lubrication gap 14 to monitor a sliding bearing element 2 during operation of the sliding bearing element 2.

In general, the sliding bearing assembly 1, can be applied in or on machine parts with accelerations that vary in time and/or direction relative to the piezo element 8 or the sensor 5, in particular for the generation of electrical energy.

The sensor 5 or the piezo-active element can be used for pressures up to 10,000 bar in the lubrication gap 14.

With the piezo element 8 or the sensor 5, powers between 1 mW and 1 W and more can be provided.

Another advantage is that the space required for the piezo element 8 or the sensor 5 is relatively small, for example between 1 cm$^3$ and 15 cm$^3$.

The sliding bearing assembly 1 can be used in particular in a temperature range up to 200° C.

It should be mentioned that, in contrast to the sensor 5 generating electrical energy, the piezo element 8 preferably has no connection to the lubrication gap 14 or to the lubricant.

The embodiment examples show possible embodiment variants of the sliding bearing assembly 1, whereby it should be noted at this point that combinations of the individual embodiment variants with one another are also possible.

Finally, for the sake of order, it should be noted that for a better understanding of the structure of the sliding bearing assembly 1 or its components, these are not necessarily shown to scale.

A sliding bearing assembly includes at least one sliding bearing element which is arranged in a bearing receptacle that is part of a bearing structure having at least one sensor connected to a data transmission device for data transmission to a receiver of the data, and to an energy generating device. The energy generating device supplies the sensor and/or the data transmission device with electrical energy in a self-sufficient manner, and may include a piezo element which is pretensioned under pressure. In some embodiments, the energy generating device is the sensor.

The invention claimed is:

1. A sliding bearing assembly comprising:
   at least one sliding bearing element which is arranged in a bearing receptacle, the bearing receptacle being part of a bearing structure, and the bearing structure having at least one sensor connected to a data transmission device for data transmission to a receiver of the data, and having an energy generating device for supplying the sensor and the data transmission device with electrical energy in a self-sufficient manner, wherein
   the energy generating device has at least one piezo element and the energy generating device is the sensor, and
   the piezo element is acted upon by a lubricant pressure in a lubrication gap between the sliding bearing element and a shaft or a bearing receptacle, for which purpose the sensor is arranged in the lubrication gap of the sliding bearing assembly as part of a sliding layer of the sliding bearing element or is hydrostatically connected to the lubrication gap.

2. The sliding bearing assembly according to claim 1, wherein the piezo element is connected to a seismic mass.

3. The sliding bearing assembly according to claim 1 wherein the piezo element is pretensioned under pressure.

4. The sliding bearing assembly according to claim 1, wherein the bearing structure is a connecting rod with a connecting rod shank, and the data transmission device is arranged on or at least partially in the connecting rod shank.

5. A method for monitoring a sliding bearing element in a sliding bearing receptacle of a sliding bearing assembly with at least one sensor, wherein a measured value is detected with the sensor and this measured value is forwarded to a data transmission device for data transmission to a receiver of the data, the method comprising:
   generating electrical energy for the sensor and the data transmission device by the movement of the sliding bearing element or the sliding bearing assembly via at least one piezo element implemented as a sensor so that the generation of the electrical energy takes place with the sensor, wherein the sensor is arranged in a lubrication gap of the sliding bearing assembly as part of a sliding layer of the sliding bearing element or is hydrostatically connected to the lubrication gap and the pressure in the lubrication gap is measured with the sensor.

6. The method according to claim 5, wherein the piezo element is pretensioned under pressure.

* * * * *